INVENTOR.
STEWART ALFRED MAXWELL
By Kurt Kelman
agent

June 15, 1965  S. A. MAXWELL  3,189,225
HOT WATER SUPPLY APPARATUS FOR A BEVERAGE DISPENSING MACHINE
Filed July 16, 1963  2 Sheets-Sheet 2

INVENTOR.
STEWART ALFRED MAXWELL
BY Kurt Kelman
    agent.

United States Patent Office 3,189,225
Patented June 15, 1965

3,189,225
HOT WATER SUPPLY APPARATUS FOR A BEVERAGE DISPENSING MACHINE
Stewart Alfred Maxwell, Walsall, England, assignor to Fisher & Ludlow Limited, Birmingham, England, a British company
Filed July 16, 1963, Ser. No. 295,552
Claims priority, application Great Britain, July 19, 1962, 27,686/62
2 Claims. (Cl. 222—64)

This invention relates to hot water supply apparatus for beverage dispensing machines of the kind which include means for mixing dry beverage ingredients with hot water and conveying the resultant beverage to a dispensing station The beverage dispensing machine may also include means for delivering liquid milk from a storage tank for admixture with the other beverage ingredients.

The hot water supply apparatus may be of the kind known as a flow through heater in which a certain volume of cold water is fed through an inlet pipe and a corresponding volume of hot water fed from the heater through an outlet pipe.

It is an object of the present invention to provide a hot water supply apparatus for a beverage dispensing machine which includes means for preventing withdrawal of an excessive volume of water through the inlet pipe in the event that the pressure in the inlet pipe falls below atmospheric pressure.

It is a further object of the invention to provide a hot water supply apparatus which includes an expansion pipe and a normally open valve in the expansion pipe whereby water may pass through the valve as the volume of water in the apparatus gradually increases due to the thermal expansion of water.

The invention will now be described with reference to the accompanying drawings in which.

Figure 1:
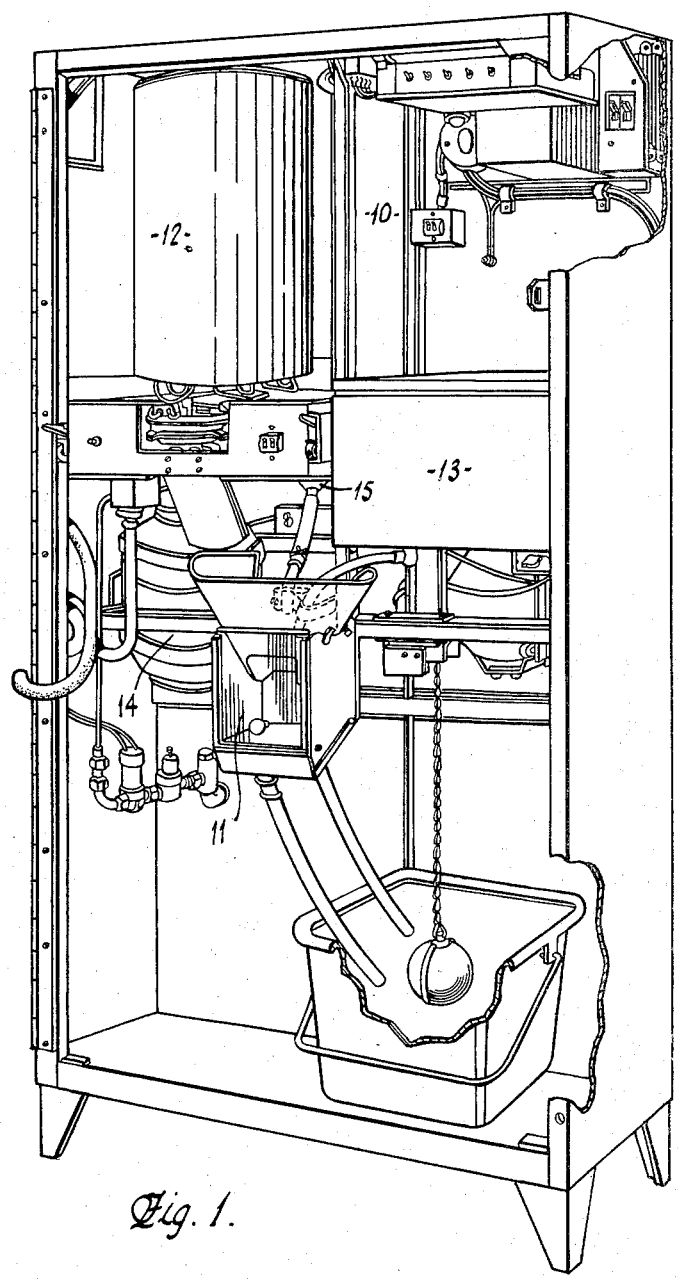
FIGURE 1 is a perspective detail view of a beverage dispensing machine embodying a liquid storage vessel.

The beverage dispensing machine shown in FIGURE 1 includes a dry commodity dispensing unit 10 and the door of the machine (not shown) includes a coin selector mechanism. Cups are supplied to a discharge point 11 from a cup dispenser 12 and milk if required is supplied from a tank 13. Hot water is supplied from a boiler or liquid storage vessel 14 to a mixing chamber 15 from which it passes together with the dry commodities to a cup already placed at the discharge point 11. Water is supplied from the mains to the boiler 14 and the boiler is provided with two outlets and an expansion pipe, water from one of the outlets is used for making the beverage and water from the other outlet is used for flushing the pipes through which milk has passed.

Figure 2:
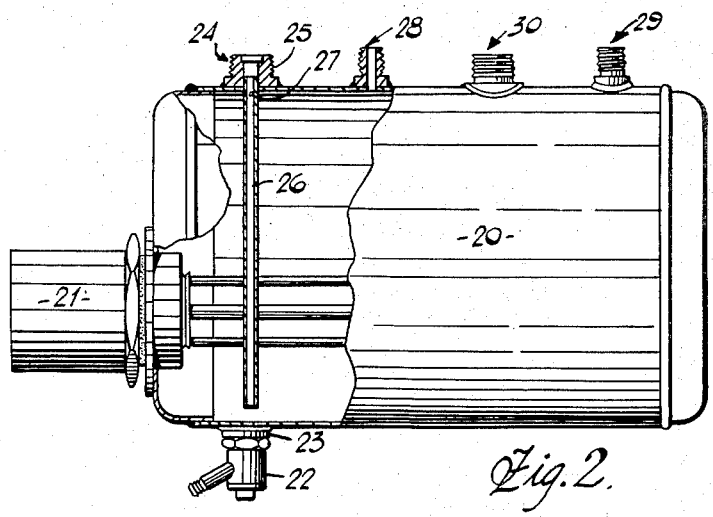
FIGURE 2 is a part-sectional view of another form of liquid storage vessel.
Figure 3:
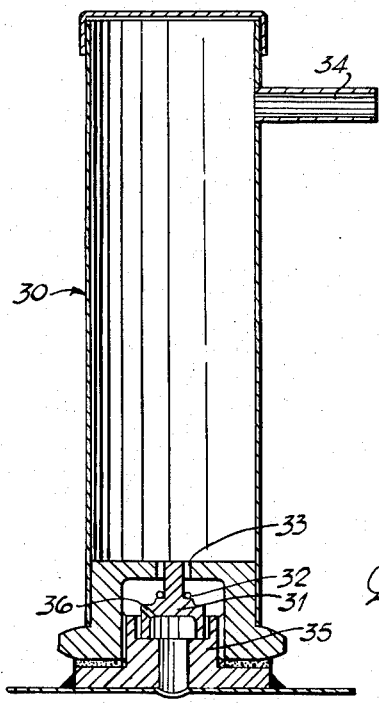
FIGURE 3 is a sectional front view of an expansion valve for use with the liquid storage vessel.

The vessel 20 shown in FIGURE 2 is about 1 foot long and seven inches in diameter and contains a thermostatically controlled immersion heater 21 which extends through and is mounted in an aperture in the side of the vessel. The base of the vessel has an aperture define by a short downwardly extending cylindrical wall within which is welded a hollow internally threaded housing for a drainplug 22. This plug has a threaded shank for engagement within the housing and an enlarged head between which and the end of the housing is located a sealing ring 23. The head is hexagonal to enable it to be readily removed and replaced for drainage purposes.

At the top of the vessel and near one end there is provided an inlet 24 which includes an externally threaded boss 25 having an axial bore. The lower portion of the axial bore receives one end of an open ended rigid tube 26 which extends vertically downwards into the vessel to a depth of about 6". At a position about ⅛" below the flat part of the cap the tube has a circular aperture 27 3/32 in diameter facing generally away from the axis of the vessel. To secure an inlet pipe to the boss a nut having an inturned rim at its upper end is used, the rim engages over a flange on a sleeve surrounding the inlet pipe.

The outlets 28 and 29 from the vessel are located on the top of the vessel. The outlets each include a cylindrical body which is welded within a short upstanding cylindrical flange surrounding an aperture in the vessel and which is integral at the top with an externally threaded boss of reduced diameter as compared with the body. An axial bore extends throughout the length of the body and the boss is in communication with an outlet pipe secured to the boss by a nut in the same manner as the inlet pipe. The outlet 28 is used to supply water for mixing with the dry commodities as a result of actuation of the machine and the outlet 29 is used to supply water for flushing the pipes through which milk has passed.

An expansion pipe 30 is provided which is open at its upper end to the atmosphere, the cross-sectional area of the expansion pipe is an order of magnitude greater than the cross-sectional area of the outlet bores. The expansion pipe includes a valve member 31 which has a sealing ring 32 mounted thereon which is adapted to co-operate with a valve seat 33 in the event that the valve member should move upwardly.

The storage vessel is intended in use to be filled with water to a level between the base of the expansion pipe 30 and the overflow pipe 34. The position of the overflow pipe determines the maximum level of water. If the water in the vessel expands as a result of an increase in temperature the water is free to flow slowly past the valve member 31 between which and seating 35 there is a gap, the valve member is also formed with a bore 36.

If water is introduced into the vessel through the inlet 24 one of the outlets is automatically opened and water is free to flow out through the appropriate outlet. As a result of the sudden increase in pressure in the vessel the valve member 31 in the expansion pipe 30 is caused to move upwardly so that the sealing ring 32 engages with the seating 33 to close the expansion pipe. Thus while the water in the expansion pipe compensates for slow variations in the water level it has little or no effect on the sudden increase in pressure produced by the introduction of water through the inlet and thus the volume of hot water delivered through the outlet pipe will be substantially equal to the volume of the incoming cold water.

Since the lower end of the vertical rigid tubular part of the inlet 24 is at a depth of 5" or 6" and the small aperture 27 in the tube faces away from the outlets 28 and 29 the temperature of the water delivered through the outlets will be little affected by the cold water entering the vessel.

If the pressure of the supply falls below atmospheric pressure water will be drawn back through the inlet until there is no water in the expansion pipe, the level of water in the vessel itself will then fall until the small aperture 27 in the inlet is uncovered. This will put the inlet in communication with the atmosphere and no further liquid will be removed.

The storage vessel 20 will deliver a predetermined quantity of liquid for mixing with the other ingredients of the beverage and there is no necessity to provide a pressure-break tank which would occupy a large amount of space. Before reaching the boiler the water passes from the mains through a filter, a non-return valve, a solenoid operated valve which is opened automatically for a predetermined time when the machine is operated, and a pressure regulator which serves to maintain the pressure of the water delivered by the solenoid valve at a constant value independent of any changes in mains pressure.

What I claim then is:

1. In a beverage dispensing machine which includes means for mixing dry beverage ingredients with hot water in a mixing chamber and conveying the resultant beverage to a dispensing station, a hot water supply apparatus including a container having heating means, the said container including:

(a) an outlet pipe leading to said mixing chamber,
(b) an inlet pipe disposed adjacent said outlet pipe, said inlet pipe extending a substantial distance into said container and having a discharge opening at the lower end thereof, said inlet pipe being formed adjacent its upper end with a hole facing away from the outlet pipe, the hole being of substantial smaller cross-sectional area than the discharge opening of the inlet pipe,
(c) an expansion pipe,
(d) a normally open valve in said expansion pipe whereby said container is normally in communication with the atmosphere via said expansion pipe and whereby a gradual flow of water from the container into the expansion pipe is permitted, and
(e) a valve closure member which closes the normally open valve when the pressure inside the container is rapidly increased, the container in use being completely filled with water whereby the introduction of a given volume of cold water into the container through the inlet pipe causes the same volume of hot water to be discharged through the outlet pipe and the provision of the hole in the inlet pipe ensuring that, in the event of the pressure in the inlet supply falling below atmospheric pressure, the maximum volume of water which will be withdrawn through the inlet will be only that volume which is above the level of the hole in the inlet pipe, the inlet pipe thereafter being in communication with the atmosphere via said expansion pipe.

2. In a beverage dispensing machine which includes means for mixing dry beverage ingredients with hot water in a mixing chamber and conveying the resultant beverage to a dispensing station, a milk storage tank, and a conduit extending from said milk storage tank to said dispensing station, a hot water supply apparatus including:

(a) a first outlet pipe leading to said mixing chamber,
(b) a second outlet pipe for supplying hot water for flushing the conduit after milk has passed therethrough,
(c) an inlet pipe disposed adjacent one of said outlet pipes, said inlet pipe extending a substantial distance into said container and having a discharge opening at the lower end thereof, said inlet pipe being formed adjacent its upper end with a hole facing away from the outlet pipes, the hole being of substantially smaller cross-sectional area than the discharge opening of the inlet pipe,
(d) an expansion pipe,
(e) a normally open valve in said expansion pipe whereby said container is normally in communication with the atmosphere via said expansion pipe and whereby a gradual flow of water from the container into the expansion pipe is permitted, and
(f) a valve closure member which closes the normally open valve when the pressure inside the container is rapidly increased, the container in use being completely filled with water whereby the introduction of a certain volume of cold water into the container through the inlet pipe causes the same volume of hot water to be dispensed through one of the outlet pipes depending upon which of the outlets has been opened, the provision of the hole in the inlet pipe ensuring that in the event of the pressure in the inlet supply falling below atmospheric pressure the maximum volume of water which will be withdrawn will be only that volume which is above the level of the hole in the inlet pipe, the inlet pipe thereafter being in communication with the atmosphere via said expansion pipe.

References Cited by the Examiner

UNITED STATES PATENTS

| | | | |
|---|---|---|---|
| 495,236 | 4/93 | Wilhemi | 126—361 |
| 1,790,357 | 1/31 | Stack | 126—361 |
| 2,592,863 | 4/52 | Conner | 126—362 X |
| 2,786,126 | 3/57 | Kendon | 126—362 X |
| 2,894,109 | 7/59 | Kendon. | |

LOUIS J. DEMBO, *Primary Examiner.*

HADD S. LANE, *Examiner.*